United States Patent

Eaton

[15] 3,643,991
[45] Feb. 22, 1972

[54] CONDUIT THREADING TOOL
[72] Inventor: Jack Eaton, Gleason, Wis.
[73] Assignee: Van Ert Electric, Rudolph, Wis.
[22] Filed: June 1, 1970
[21] Appl. No.: 42,005

[52] U.S. Cl. ................................................294/19
[51] Int. Cl. ................................................A47f 13/06
[58] Field of Search..................294/19, 5.5, 26, 1, 15, 27; 81/1, 3

[56] References Cited

UNITED STATES PATENTS 2,785,920 3/1957 Barnes....................................294/26
1,675,812 7/1928 Loyd.......................................294/15

Primary Examiner—Joseph Wegbreit
Assistant Examiner—I. Kenneth Silverman
Attorney—Andrus, Sceales, Starke & Sawall

[57] ABSTRACT

A tool to be used in threading conduit or pipe section together. The tool includes a roller to be inserted in the free end of the pipe section, and the roller is journaled on a shaft which extends outwardly from the lower end of a column. A pair of handles project from opposite sides of the column and are adapted to be grasped by a workman to hold the free end of the pipe section above the ground and in alignment with the other pipe section to be joined. As the pipe section is manually rotated to threadedly connect the pipe sections, the pipe section will rotate freely on the roller.

4 Claims, 4 Drawing Figures

PATENTED FEB 22 1972 3,643,991

INVENTOR.
Jack Eaton

BY Andrus, Sceales, Starke & Sawall
Attorneys

CONDUIT THREADING TOOL

This invention relates to a conduit or pipe threading tool to be used in threading conduit or pipe sections together.

Electrical conduit or sanitary pipe is generally composed of a series of sections which are threaded together. When the conduit has a substantial length, of perhaps 10 to 20 feet, the services of several workmen are required to connect the pipe sections. One workman will align the threaded end of the pipe section with the existing pipeline, while a second workman will hold the free end of the pipe section above the ground in alignment with the pipeline. Depending on the length and size of the section, in some instances a third workman is also employed to hold the central portion pipe section. As the pipe section is threaded into the existing pipeline, it is necessary for each workman to rotate the pipe section through an increment of rotation and then regrasp the pipe section in preparation for a second increment of rotation. This action requires realignment of the pipe section after each increment rotation. Thus, the threading operation is a rather difficult task and this is particularly true when the pipeline is located in a narrow trench or other inaccessible location where it is very difficult for workmen to hold and align the pipe section for threading purposes.

The present invention is directed to a tool for assisting in the threading of pipe sections or conduit. More specifically, the tool includes a roller to be inserted in the free end of the pipe section to be threaded to a second pipe section or an existing pipeline. The roller is journaled on the end of a shaft and the shaft is attached to the lower end of a vertical support member or column. A pair of handles extend outwardly from the upper portion of the support member and the workman, by lifting upwardly on the handles, can elevate the free end of the pipe section slightly above the ground so that it is out of contact with the ground and in axial alignment with the existing pipeline. With the pipe section in aligned condition, a second workman can then rotate the pipe section to provide the threaded connection and during rotation, the pipe section will freely rotate on the roller.

The tool of the invention aids in providing alignment of the pipe section with the existing pipeline, because the workman using the tool of the invention will be standing upright in a better position to visually determine whether the pipe sections are in alignment.

As a further advantage, the tool enables the free end of the pipe section to be held above the ground where it can freely rotate without interference with the ground and where sand, soil or other foreign material will not accumulate within the pipe section during the threading operation.

Due to the fact that the pipe section is supported by, and can freely rotate on, the roller, the threading operation can be accomplished in a substantially shorter period of time with the service of fewer workmen and this substantially reduces the overall labor cost in threading the pipe section or conduit.

A further and important advantage is that the tool enables the pipe section to be properly aligned and journaled for rotation even in relatively inaccessible locations, such as deep narrow trenches.

The tool of the invention can be used for threading any type or size of rigid pipe, tubing, conduit or the like.

Other objects and advantages will appear in the course of the following description.

The drawings illustrate the best mode presently contemplated of carrying out the invention.

The drawings illustrate a pair of pipe sections or conduits 1 and 2 to be threaded together in an end-to-end relation. Each pipe section is provided with a threaded male end 3 which is to be engaged with the threaded female end 4 of the other pipe section.

Figure 2:
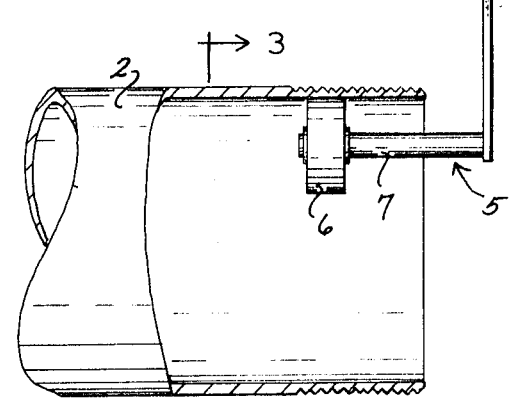
FIG. 2 is an enlarged side elevation of the tool as located in the pipe with parts broken away in section.

According to the invention, a tool 5 is employed to aid in threading the pipe sections 1 and 2 together. The tool 5 includes a roller 6 which is journaled for rotation on the end of a horizontal shaft 7. The shaft 7 is connected to the lower end of a vertical support member or column 8, and as shown in FIG. 2, the shaft 7 extends at an angle of about 90° with respect to the support member 8. A pair of crossbars or handles 9 are provided on the upper portion of the support member 8 at a level where they can be readily grasped by an operator to lift the device above the ground.

Figure 4:
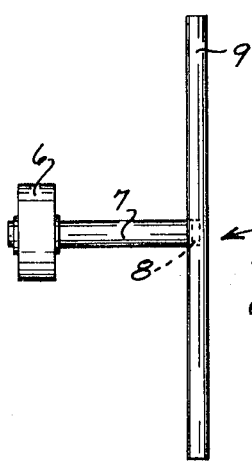
FIG. 4 is a top view of the tool.

As shown in FIG. 4, the handles are positioned diametrically opposite on the support member 8 and are each displaced approximately 90° from the axis of the shaft 7.

Figure 1:
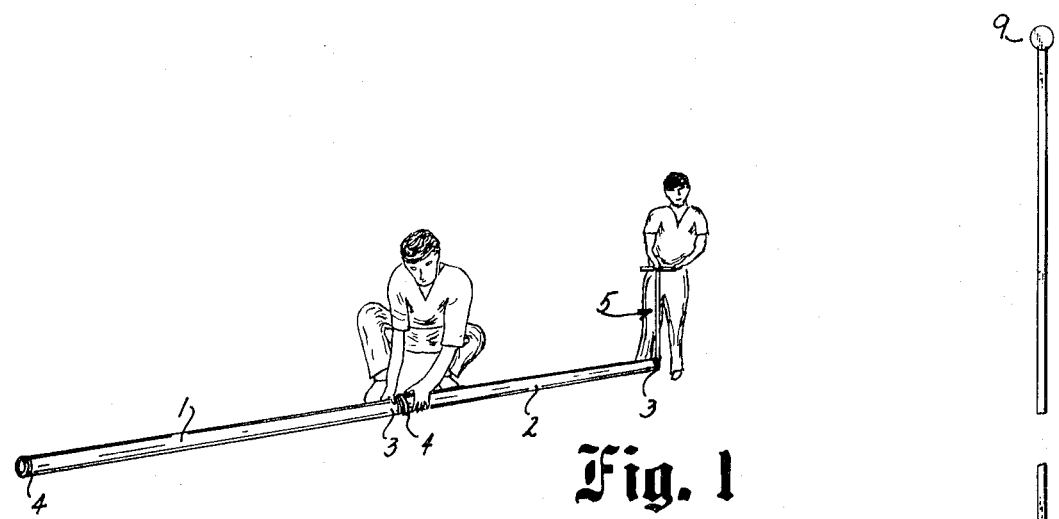
FIG. 1 is a perspective view of the pipe threading tool of the invention as utilized with a pipe section.
Figure 3:
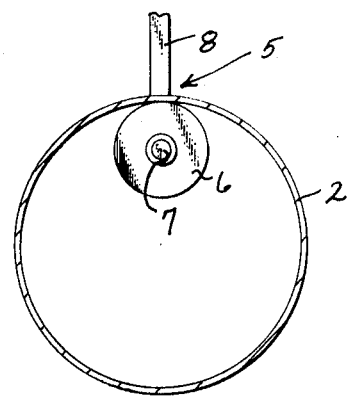
FIG. 3 is a transverse section taken along line 3—3 of FIG. 2.

In operation of the pipe threading tool of the invention, the male end 3 of pipe section 2 is aligned by a workman with the female end 4 of the other pipe section 1. A second workman, grasping the handles 9, inserts the roller 6 into the free end of the pipe section 2, as shown in FIG. 1. With the roller inserted within the end of the pipe section, the workman lifts upwardly on the handles 9, elevating the free end of the pipe section 2 to a position where it is in axial alignment with the pipe section 1. With the pipe sections properly aligned, the first workman will then manually rotate the pipe section 2 to thread the pipe sections together. During rotation of the pipe section 2, it will rotate freely on the roller 6.

The tool of the invention facilitates alignment of the pipe sections 1 and 2 due to the fact that the workman utilizing the tool is upright and is in a better position to visually gauge the alignment of the pipe sections. This not only facilitates threading but eliminates any problems of misthreading or jamming of the threaded connections.

The tool enables the free end of the pipe section 2 to be elevated above the ground so it can freely rotate during threading on the roller 6, and this not only minimizes frictional contact with the ground, but also reduces the possibility of soil or other material entering the free end of the pipe section.

The tool is particularly useful when joining pipe sections together in relatively deep or narrow trenches. With the use of the tool, the workman using the tool need not enter the trench but can stand at grade level and lower the tool into the trench to support the free end of the pipe section.

The tool of the invention is adapted to be used for joining various types of pipe, conduit or tubing, including those formed of metal, reinforced plastic, fibrous material, or the like.

I claim:

1. A pipe threading tool, comprising a support member, rotatable means journaled for rotation with respect to an end of the support member and including a shaft and a roller carried by the shaft, said roller adapted to be positioned within the free end of a first pipe section to be joined to a second pipe section, the axis of said shaft being disposed generally normal to said support member, and handle means attached to the opposite end portion of said support member and extending laterally therefrom in a position to be grasped by an operator, said operator adapted to lift the support member and said first pipe section above ground to align said pipe sections, said first pipe section being freely rotatable on said rotatable means as said first pipe section is threaded into engagement with said second pipe section.

Various modes of carrying out the invention are contemplated as being within the scope of the following claims which particularly point out and distinctly claim the subject matter which is regarded as the invention.

2. The tool of claim 1, wherein said handle means comprises a pair of handles extending outwardly in opposite directions from said support member.

3. The tool of claim 2, wherein said handles are located diametrically opposite on said support member and both of said handles are displaced 90° with respect to said shaft.

4. A tool for assisting in threading pipe sections together, comprising a vertical elongated support member, a shaft connected to the lower end of the support member and disposed at an angle of approximately 90° with respect to said support member, a roller journaled on said shaft and adapted to be inserted within one end of a first pipe section, the opposite end of said first pipe section adapted to be threaded into engagement with an end of a second pipe section, and a pair of handles extending outwardly from opposite sides of the upper portion of the support member in position to be grasped by an operator, said operator lifting said support member through said handles to thereby elevate the first pipe section above the ground and permit said first pipe section to rotate freely on said roller, as said first pipe section is manually threaded into engagement with said second pipe section.

* * * * *